United States Patent
Kvalnes et al.

(10) Patent No.: US 11,652,776 B2
(45) Date of Patent: May 16, 2023

(54) SYSTEM OF MOBILE NOTIFICATION DELIVERY UTILIZING BLOOM FILTERS

(71) Applicant: Microsoft Technology Licensing, LLC, Redmond, WA (US)

(72) Inventors: Age Kvalnes, Kvalysletta (NO); Dmitriy Meyerzon, Bellevue, WA (US); Jeffrey L. Wight, Kirkland, WA (US); Nikita Voronkov, Bothell, WA (US); Praveen Kumar Reddy Malireddy, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 935 days.

(21) Appl. No.: 15/714,677

(22) Filed: Sep. 25, 2017

(65) Prior Publication Data

US 2019/0097961 A1 Mar. 28, 2019

(51) Int. Cl.
*H04L 51/48* (2022.01)
*H04L 51/216* (2022.01)
(Continued)

(52) U.S. Cl.
CPC .......... *H04L 51/48* (2022.05); *G06Q 10/101* (2013.01); *H04L 51/216* (2022.05);
(Continued)

(58) Field of Classification Search
CPC .............................. H04W 4/12; G06Q 10/107
See application file for complete search history.

(56) References Cited

U.S. PATENT DOCUMENTS

| | | | |
|---|---|---|---|
| 6,457,045 B1 | 9/2002 | Hanson et al. |
| 6,782,415 B1 | 8/2004 | Quine |

(Continued)

FOREIGN PATENT DOCUMENTS

| | | |
|---|---|---|
| CN | 101842803 A | 9/2010 |
| CN | 105264516 A | 1/2016 |

OTHER PUBLICATIONS

"International Search Report And Written Opinion Issued In PCT Application No. PCT/US2018/025618", dated May 25, 2018, 11 Pages.

(Continued)

*Primary Examiner* — Brian Whipple
(74) *Attorney, Agent, or Firm* — Shook, Hardy & Bacon, L.L.P.

(57) ABSTRACT

Systems and methods for providing notification delivery based on utilization of bloom filters are provided. A collaboration system obtains subscriber information for each user of a collaboration system, whereby the subscriber information corresponds to one or more features of content that are relevant to each user. The collaboration system hashes the subscriber information to generate a bloom filter for each user. The collaboration system receives an article to be published, whereby the article comprises a set of features. The set of features is hashed to obtain a hash set. The hashing of the set of features is performed using same hashing functions as that used to generate the bloom filter. The collaboration system compares the hash set to the bloom filter to identify a match, whereby the match indicates a feature of the article matches the subscriber information. The collaboration system generates a list of recipients based on the match.

20 Claims, 6 Drawing Sheets

(51) Int. Cl.

| | |
|---|---|
| *H04L 51/224* | (2022.01) |
| *H04W 4/12* | (2009.01) |
| *G06Q 10/101* | (2023.01) |
| *G06Q 10/10* | (2012.01) |
| *G06Q 10/107* | (2023.01) |

(52) U.S. Cl.
CPC ............. *H04L 51/224* (2022.05); *H04W 4/12* (2013.01); *G06Q 10/107* (2013.01)

(56) References Cited

U.S. PATENT DOCUMENTS

| | | | | |
|---|---|---|---|---|
| 8,260,665 | B2* | 9/2012 | Foladare | G06Q 30/02 705/14.5 |
| 9,485,212 | B1 | 11/2016 | Bastide et al. | |
| 2005/0038863 | A1 | 2/2005 | Onyon et al. | |
| 2005/0246736 | A1* | 11/2005 | Beyda | H04N 21/6582 725/35 |
| 2008/0114847 | A1 | 5/2008 | Ma et al. | |
| 2008/0162364 | A1* | 7/2008 | Martin | G06Q 20/401 705/75 |
| 2008/0255919 | A1 | 10/2008 | Gorder | |
| 2010/0082648 | A1* | 4/2010 | Potapov | G06F 16/2456 707/800 |
| 2010/0088378 | A1 | 4/2010 | Asawa et al. | |
| 2010/0228701 | A1* | 9/2010 | Harris, III | H04L 51/12 711/216 |
| 2010/0299727 | A1* | 11/2010 | More | G06F 21/554 726/5 |
| 2011/0320538 | A1* | 12/2011 | Ickman | G06F 9/542 709/206 |
| 2012/0078725 | A1* | 3/2012 | Maitra | G06Q 30/0269 705/14.66 |
| 2012/0143965 | A1 | 6/2012 | Parker et al. | |
| 2012/0192086 | A1 | 7/2012 | Ghods et al. | |
| 2014/0143139 | A1 | 5/2014 | Koplovitz et al. | |
| 2014/0181933 | A1* | 6/2014 | Sanjeev | H04L 63/0823 726/7 |
| 2014/0304238 | A1* | 10/2014 | Halla-Aho | H04L 51/12 707/692 |
| 2014/0337314 | A1* | 11/2014 | Potapov | G06F 3/0611 707/714 |
| 2014/0372216 | A1 | 12/2014 | Nath et al. | |
| 2015/0019575 | A1 | 1/2015 | Dayon et al. | |
| 2015/0181556 | A1 | 6/2015 | Dey et al. | |
| 2015/0220625 | A1* | 8/2015 | Cartmell | G06F 16/9014 707/754 |
| 2015/0347585 | A1 | 12/2015 | Klotz | |
| 2016/0086228 | A1 | 3/2016 | Babb et al. | |
| 2016/0154861 | A1* | 6/2016 | Hegerty | G06F 40/232 707/728 |
| 2016/0248853 | A1 | 8/2016 | Chiu | |
| 2016/0371729 | A1 | 12/2016 | Glover et al. | |
| 2018/0302482 | A1 | 10/2018 | Haon et al. | |
| 2019/0095448 | A1 | 3/2019 | Kvalnes et al. | |

OTHER PUBLICATIONS

"Non Final Office Action Issued in U.S. Appl. No. 15/486,007", dated Dec. 20, 2018, 7 Pages.

"International Search Report and Written Opinion Issued in PCT Application No. PCT/US2018/039203", dated Oct. 30, 2018, 12 Pages.

Final Office Action Issued in U.S. Appl. No. 15/486,007, dated May 22, 2019, 8 Pages.

"Adobe Experience Manager Mobile", Retrieved from: <<https://web.archive.org/web/20161204132528/http://blogs.adobe.com/aemmobile/2015/10/three-ways-to-make-apps-that-your-employees-will-actually-use.html>>, Oct. 21, 2015, 3 Pages.

"Bitrix Intranet Portal", Retrieved from: <<http://www.bitrixsoft.com/download/files/bitrix_reviewers_guide.pdf>>, Apr. 2010, 13 Pages.

"Desktop Alert Software", Retrieved from: <<http://www.snapcomms.com/products/desktop-alert>>, Retrieved on: Jan. 23, 2017, 6 Pages.

"Easi Sms", Retrieved from: <<https://collegelisted.com/blogs/sample-essays/easi-sms>>, Retrieved on: Jan. 23, 2017, 7 Pages.

"Go Mobile to Publish Internal News Faster and Smarter", Retrieved from: <<https://web.archive.org/web/20170413012238/https://www.orteccommunications.com/relevance-app/#>>, Retrieved on: Jan. 23, 2017, 19 Pages.

"How to Engage Your Employees with Push Notifications and Banner Messages", Retrieved from: <<https://www.modolabs.com/blog-post/how-to-engage-your-employees-with-push-notifications-and-banner-messages/>>, Nov. 13, 2015, 7 Pages.

"IBM Alert Notification", Retrieved from <<https://www.ibm.com/support/knowledgecenter/en/SSY487/com.ibm.netcool_OMNIbusaas.doc_1.2.0/concept/emaas_ins_overview.html>>, Retrieved on: Jan. 25, 2017, 1 Page.

Hauswirth, et al., "A Component and Communication Model for Push Systems", In Proceedings of 7th European Software Engineering Conference Held Jointly with the 7th ACM SIGSOFT Symposium on the Foundations of Software Engineering Toulouse, Sep. 6, 1999, 19 Pages.

Purse, Jill, "Intranet Notifications Keep Employees Up-To-Date and Engaged", Retrieved from: <<https://www.thoughtfarmer.com/blog/7-0-intranet-notifications/>>, Jun. 11, 2014, 5 Pages.

Tariq, Hamzah, "The Power of Push Notifications in Internal Communication", Retrieved from: <<https://www.reachplus.com/the-power-of-push-notifications-in-internal-communication/>>, Jan. 9, 2014, 2 Pages.

Wolf, Frank, "Mobile Intranet CMS—Communication and News Management", Retrieved from <<https://insights.staffbase.com/blog/mobile-intranet-cms-communication-and-news-management>>, Retrieved on: Jan. 25, 2017, 15 Pages.

"Non Final Office Action Issued in U.S. Appl. No. 15/713,321", dated Sep. 16, 2019, 14 Pages.

"Office Action Issued in European Patent Application No. 18718663.0", dated Dec. 1, 2020, 6 Pages.

"Office Action Issued in European Patent Application No. 18746053.0", dated Feb. 17, 2021, 7 Pages.

"Summons to Attend Oral Proceedings Issued in European Patent Application No. 18718663.0", dated Jun. 28, 2021, 9 Pages.

"Summons to attend Oral Proceedings Issued in European Patent Application No. 18746053.0", dated Feb. 14, 2022, 11 Pages.

"Office Action and Search Report Issued in Chinese Patent Application No. 201880024540.X", dated August 25, 2022, 11 Pages.

U.S. Appl. No. 10/601,938, filed Mar. 24, 2020.

US-2019-0095448-A1, filed Mar. 28, 2019.

"Notice of Allowance Issued in Chinese Patent Application No. 201880024540.X", dated Jan. 20, 2023, 3 Pages.

"Notice of Allowance Issued in European Patent Application No. 18746053.0", dated Feb. 23, 2023, 8 Pages.

* cited by examiner

SYSTEM OF MOBILE NOTIFICATION DELIVERY UTILIZING BLOOM FILTERS

TECHNICAL FIELD

The subject matter disclosed herein generally relates to machines configured to the technical field of special-purpose machines that deliver notifications of published content, and to the technologies by which such special-purpose machines become improved compared to other special-purpose machines that facilitate delivery of notifications of published content. Specifically, the present disclosure addresses systems and methods to provide notification delivery based on utilization of bloom filters that encode user subscriptions, and in some embodiments, mobile notification delivery based on utilizing of bloom filters.

BACKGROUND

Collaboration systems allow users to create and share information. Some collaboration systems provide notifications to users as content (e.g., news or other articles, comments, updates, likes and other social gestures shares, re-posts, questions/comments on particular topics) and other resources are added or published to the collaboration system. In these conventional collaboration systems, a traversal of an organizational hierarchy is performed to determine users to whom a notification is provided each time a piece of content is published to the collaboration system. This process results in a large amount of processing power and may be slow in determining the users that should receive the notification. Alternatively, a special data structure would have to be built in order to create an index of subscribers to an author. In these cases, the maintenance of those data structures is difficult and expensive.

BRIEF DESCRIPTION OF THE DRAWINGS

Some embodiments are illustrated by way of example and not limitation in the figures of the accompanying drawings.

DETAILED DESCRIPTION

Figure 1:
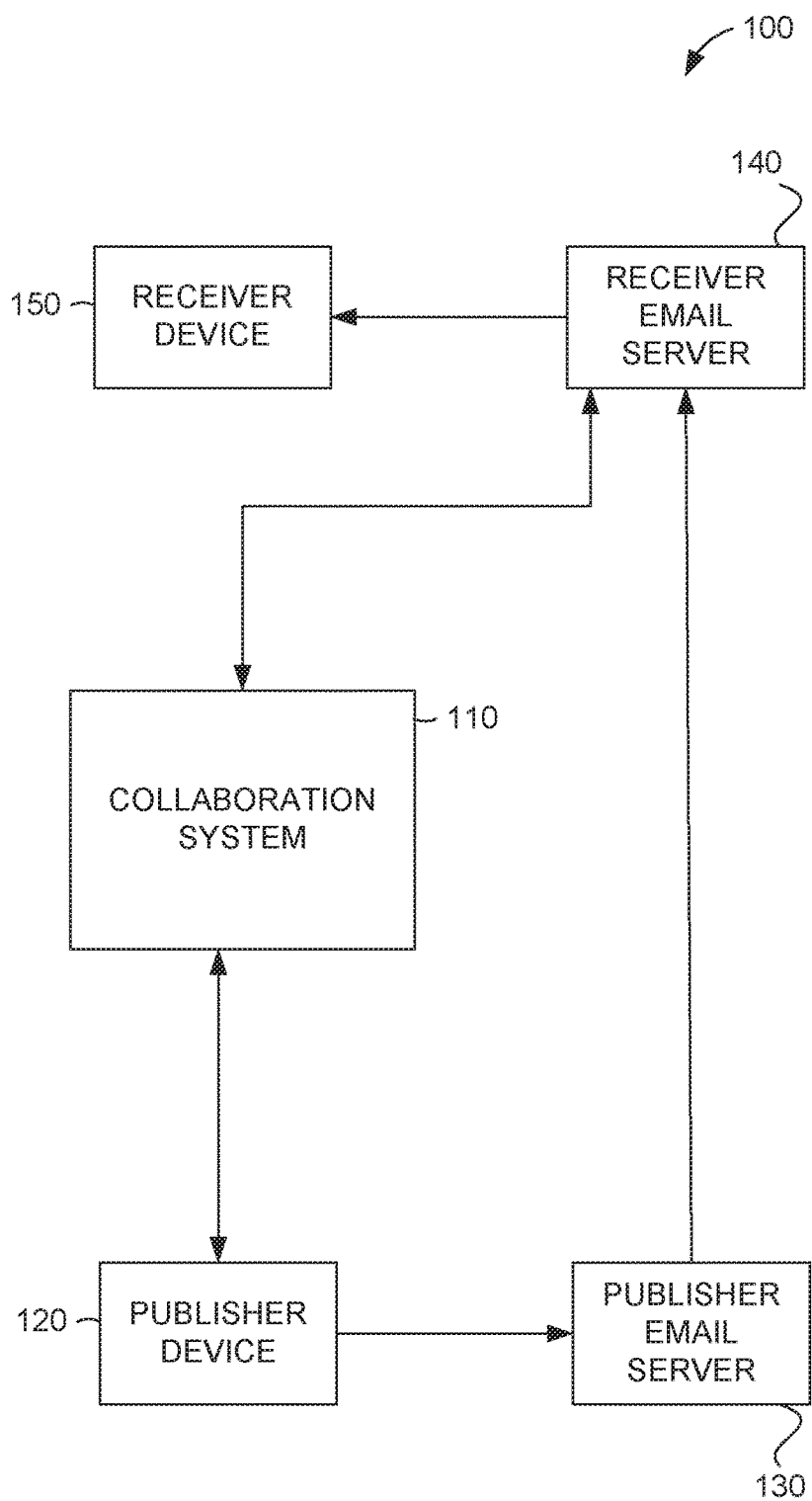
FIG. 1 is a diagram illustrating a network environment suitable for providing notification delivery utilizing bloom filters, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide notifications to appropriate users in response to publication of relevant content (e.g., content that includes at least one feature the user subscribes to) to a collaboration system (e.g., Microsoft SharePoint). Within the context of an organization or enterprise, some users may wish to receive real-time or near real-time notifications when a particular individual or group member publishes content having at least one feature that the user subscribes to on the collaboration system. In a large company, when organizational leaders or other authors publish content (e.g., a news article), a potentially large audience may be interested in reading the content. Example embodiments determine a list of recipients, generate a push notification, and cause the transmission of the notification to user devices of users on the list of recipients. In response to the notification, the users can then access the content (e.g., access a news feed or website). In some cases, a user in an organization subscribes to or gets pushed content from his management chain as well as management chains of people the user works with. Additionally, the user may subscribe to or be pushed contents from a set of sites of the collaboration system that the user frequently uses or sites the user explicitly follows. Furthermore, the user may subscribe to or be pushed content for particular topics, and be pushed content for an audience that the user is considered to be a part of (e.g., employees of a particular building, employees on a team). In example embodiments, the audience is an expression of a set of users based on user properties in an active directory.

Example methods (e.g., algorithms) facilitate delivering notification of publication of relevant content utilizing bloom filters, and example systems (e.g., special-purpose machines) are configured to provide notifications of relevant content utilizing bloom filters. In some embodiments, the notifications are mobile notifications provided to a mobile user device. In particular, example embodiments provide mechanisms and logic that generates a bloom filter for each user based on subscriber information obtained for each user, and uses the bloom filter in determining whether a notification of a new piece of content should be sent to particular users. As a result, one or more of the methodologies described herein facilitate solving the technical problem of determining and providing notification of publication of relevant content to users of a collaboration system in an efficient and fast manner. More specifically, the methodologies include logic that obtains subscriber information for each user of a collaboration system and hashes the subscriber information to generate a bloom filter for each user. The logic receives an article to be published and hashes a set of features of the article to obtain a hash set (e.g., a set of bits that should be turned on in the bloom filter should the user subscribe to any of the features). The hashing of the set of features is performed using same hashing functions as that used to generate the bloom filter. The logic then compares the hash set to the bloom filter to identify a match, whereby the match indicates a feature of the article matches the subscriber information. The logic generates a list of recipients based on the match. More specifically, each feature is hashed several times depending on a bloom filter configuration. For example, for a bloom filter configuration indicating the feature should be hashed five times, five bits will need to be turned on in order to indicate a subscription in the feature. Thus, matching in the bloom filter is done by looking for five bits for each feature. All bits must be "on" in order to match a feature. However, any feature may match in order to send a notification to the user.

As such, one or more of the methodologies described herein may obviate a need for certain efforts or computing resources that otherwise would be involved in having to traverse organizational hierarchies every time content is published in order to determine which users should receive notification of publication of relevant content (e.g., content that comprises at least one feature that the user subscribes to). As a result, resources used by one or more machines, databases, or devices (e.g., within the environment) may be reduced and notifications can be accurately provided to appropriate users. Examples of such computing resources include processor cycles, network traffic, memory usage, data storage capacity, power consumption, network bandwidth, and cooling capacity.

FIG. 1 is a diagram illustrating a network environment 100 suitable for providing notification delivery utilizing bloom filters, according to some example embodiments. The network environment 100 includes a collaboration system 110, a publisher device 120, a publisher email server 130, a receiver email server 140, and a receiver device 150 all communicatively coupled via one or more a communication networks.

In example embodiments, the collaboration system 110 comprises a browser-based collaboration system where content is published for viewing by members of a particular organization (e.g., employees of a company). The collaboration system 110 collects and processes subscriber information for each user, receives and publishes content, and efficiently derives a list of recipients to whom notification of a piece of content (e.g., also referred to herein as an "article") should be transmitted to based, in part, on their subscriber information. In example embodiments, a bloom filter is generated based on the subscriber information and compared to a hash set generated from features of the piece of content to find matches and derive the list of recipients. The operations of the collaboration system 110 is described in more detail in connection with FIG. 2 and may be implemented in a computer system, as described below with respect to FIG. 6.

The environment 100 provides a publisher at the publisher device 120 generating the article for publication by the collaboration system 110. In example embodiments, the publisher device 120 accesses functionalities of the collaboration system 110 in order to publish the article. The publishing of the article triggers the collaboration system 110 to determine a potential set of interested users (e.g., the list of recipients) using the bloom filters, as will be described in more detail below. Once the list of recipients is determined, the collaboration system 110 invokes a distribution pipeline to send a notification to each user on the list of recipients. In example embodiments, the distribution pipeline initially sends a control flow message (CFM) through an email server associated with the publisher device 120 (a "publisher email server 130"). Specifically, in an example, a call is made to the publisher email server 130 (e.g., Microsoft Exchange) with the list of recipients. The publisher email server 130 then sends the CFM over a transport/substrate bus to an email server associated with each user on the list of recipients (a "receiver email server 140").

Because the use of bloom filters may result in some false positives, the receiver email server 140 is configured to perform a verification process to confirm that the user is subscribed to receive the notification for the article. In response to verification, the notification is transmitted by the receiver email server 140 to a receiver device 150 of the user. In some embodiments, the receiver device 150 is a mobile device such as, for example, a smartphone or laptop. The operations of the receiver email server 140 will be discussed in more detail in connection with FIG. 3 below.

The components of FIG. 1 are communicatively coupled via one or more networks. One or more portions of each network may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, any of the machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and types of receiver email servers 140 and receiver devices 150 may be embodied within the environment 100. Furthermore, some components or functions of the environment 100 may be combined or located elsewhere in the environment 100. For example, some of the functions of the collaboration system 110 may be embodied within the publisher device 120 or within one of the email servers 130 or 140. While only a single collaboration system 110 is shown, alternative embodiments may contemplate having more than one collaboration system 110 to perform server operations discussed herein for the collaboration system 110.

Figure 2:
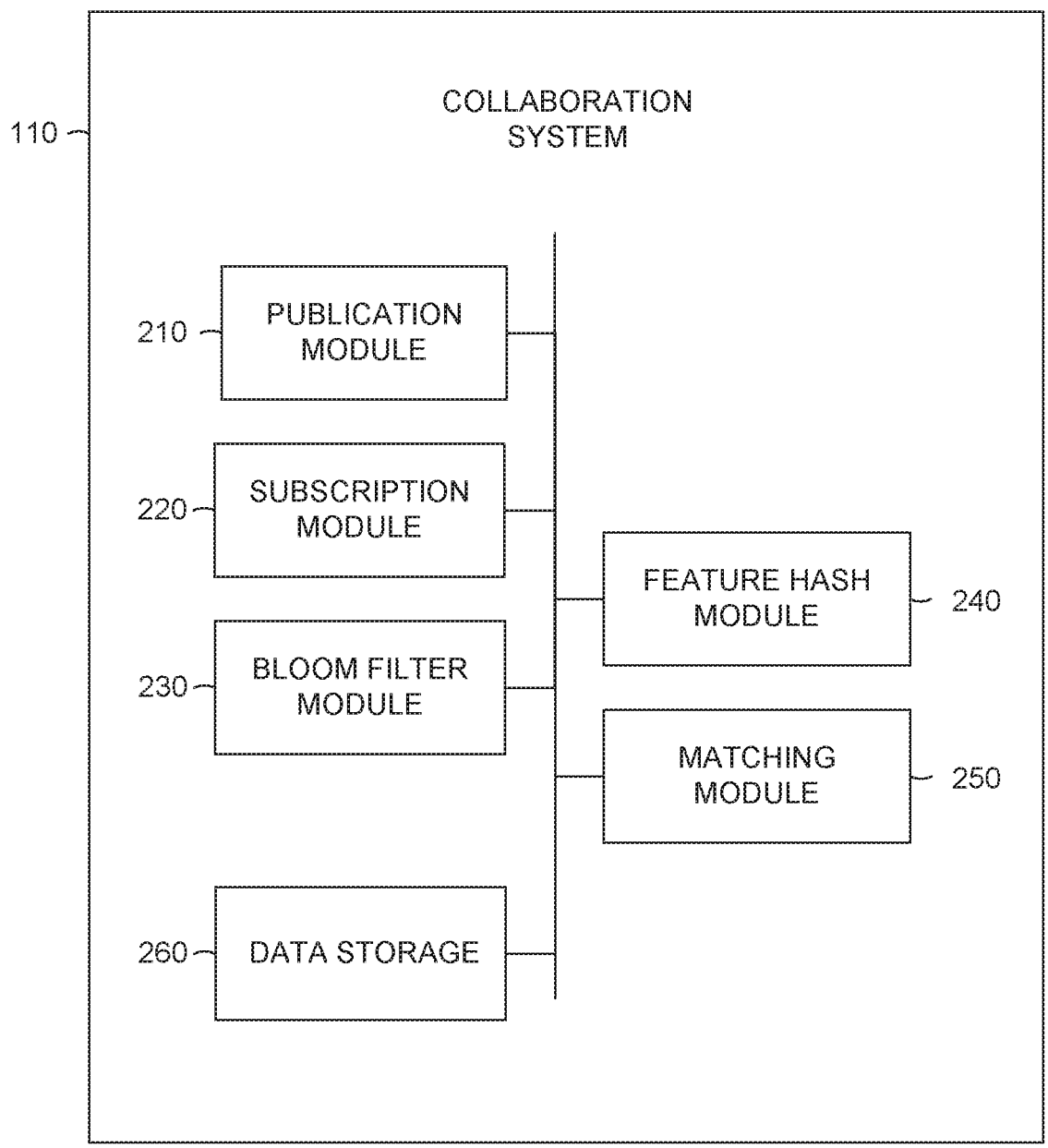
FIG. 2 is a block diagram illustrating components of a collaboration system, according to some example embodiments.

FIG. 2 is a block diagram illustrating components of the collaboration system 110, according to some example embodiments. In example embodiments, the collaboration system 110 obtains and processes subscriber information for users, receives and publishes content (e.g., on a feed), derives a list of recipients to whom notification of a piece of content should be transmitted to based, in part, on the subscriber information, and triggers a notification process to send the notification to users on the list of recipients. In example embodiments, a bloom filter is generated from the subscriber information and compared to a hash set derived from features of the piece of content to generate the list of recipients. To enable these operations, the collaboration system 110 comprises a publication module 210, a subscription module 220, a bloom filter module 230, a feature hash module 240, a matching module 250, and a data storage 260 all configured to communicate with each other (e.g., via a bus, shared memory, or a switch). In one example, the collaboration system 110 is Microsoft SharePoint. The collaboration system 110 may also comprise other components (not shown) that are not pertinent to example embodiments. Furthermore, any one or more of the components (e.g., modules, storage) described herein may be implemented using hardware (e.g., a processor of a machine) or a combination of hardware and software. Moreover, any two or more of these components may be combined into a single component, and the functions described herein for a single component may be subdivided among multiple components.

The publication module 210 publishes content that is provided by various publishers on the collaboration system 110. In example embodiments, the publication module 210 receives a piece of content from a publisher, and publishes a feed that various members of the collaboration system 110 (e.g., employees and subscribers of a company) can access. In some cases, users subscribed to the feed can access the piece of content. In other cases, any user of the collaboration system 110 can access the feed.

The subscription module 220 manages subscriptions for each user at the collaboration system 110. In example embodiments, the subscription module 220 collects (e.g., receives, obtains, retrieves) subscriber information for each user from the receiver email server 140. The subscriber information corresponds to one or more features of content that each user explicitly indicates, or for which a system has inherently determined, is relevant to the user. In example embodiments, the subscription information may indicate a set of other users to get news from (e.g., people to get the news from) that correspond to a publisher identifier (publisher ID). The set of other users may comprise people that the user has explicit or inherent relationships with (e.g., people the user goes to meetings with or email with on a regular basis, people the user reports to or has reporting to them) as well as their managers. In some cases, the set of other users may be determined from an organizational directory or hierarchy.

The subscriber information may also indicate sites the user typically gets news from (e.g., sites the user visits more than a threshold number of times, sites the user is a member of or subscribes to). Each site has a corresponding site identifier (site ID), such as a URL. Additionally, the subscriber information may indicate topics of interest that the user has explicitly or inherently shown interest in. Each topic has a corresponding topic identifier (topic ID). In some cases, the subscriber information is also determined based on an audience that the user is a member of (e.g., full time employees, employees in a particular location, people in a same organization, team, or group). Each audience may be associated with an audience identifier (audience ID). The subscriber information or updates to the subscriber information may be received in real-time or periodically (e.g., once a week). In example embodiments, the subscriber information is determined by the receiver email server 140 as will be discussed in more detail in connection with FIG. 3 below.

The subscriber information is then provided to the bloom filter module 230, which reduces an amount of information needed to link each user to content having features the user subscribes to or features determined to be relevant to the user. In particular, the bloom filter module 230 manages the application of hash functions to the subscriber information for each user in order to generate a bloom filter for each user. In example embodiments, the bloom filter module 230 uses the identifiers of the subscriber information for each user (e.g., publisher ID, site ID, topic ID, and audience ID) as raw values of a string. The bloom filter module 230 then hashes these values to obtain the bloom filters.

In example embodiments, the bloom filters are stored to the data storage 260. In some embodiments, the data storage 260 comprises a table having a user identifier (user ID) of each user as a key for each entry. In a multi-tenant environment, a tenant identifier (tenant ID) may also be included in the table whereby the tenant ID identifies the company associated with the user. Each entry of the table also includes the bloom filter for its respective user.

The feature hash module 240 manages the hashing of features of a piece of content (also referred to as "article") that is being published. In example embodiments, the feature hash module 240 detects features of the article that is being published. The features may comprise, for example, an author, a site the article is to be published to, a topic of the article, an audience (e.g., a set of people tagged for the article—full time employees or employees of a particular building, people in a particular organization). The features may be detected from metadata associated with the article or otherwise determined by the feature hash module 240 (e.g., scanning the article for keywords). The features detected for the article are hashed to obtain a hash set. In example embodiments, the same hash functions used to hash the subscriber information is used to hash the features of the article.

The matching module 250 manages identification of users that should receive a notification for the article being published and generates the list of recipients. Using the hash set for the features of the article, the matching module 250 scans the table in the data storage 260 for matching bits in the bloom filters. For example, if a bloom filter with five hash functions is used, then five bits have to be matched for each feature. For any feature that matches (e.g., all five bits), the corresponding user (e.g., based on the user ID) is included in the list of recipients. It is noted that any number of hash functions and corresponding number of matching bits can be used to determine the list of recipients. The matching module 250 then causes a control flow message (CFM) to be sent to a receiver email server 140 associated with each user on the list of recipients.

Figure 3:
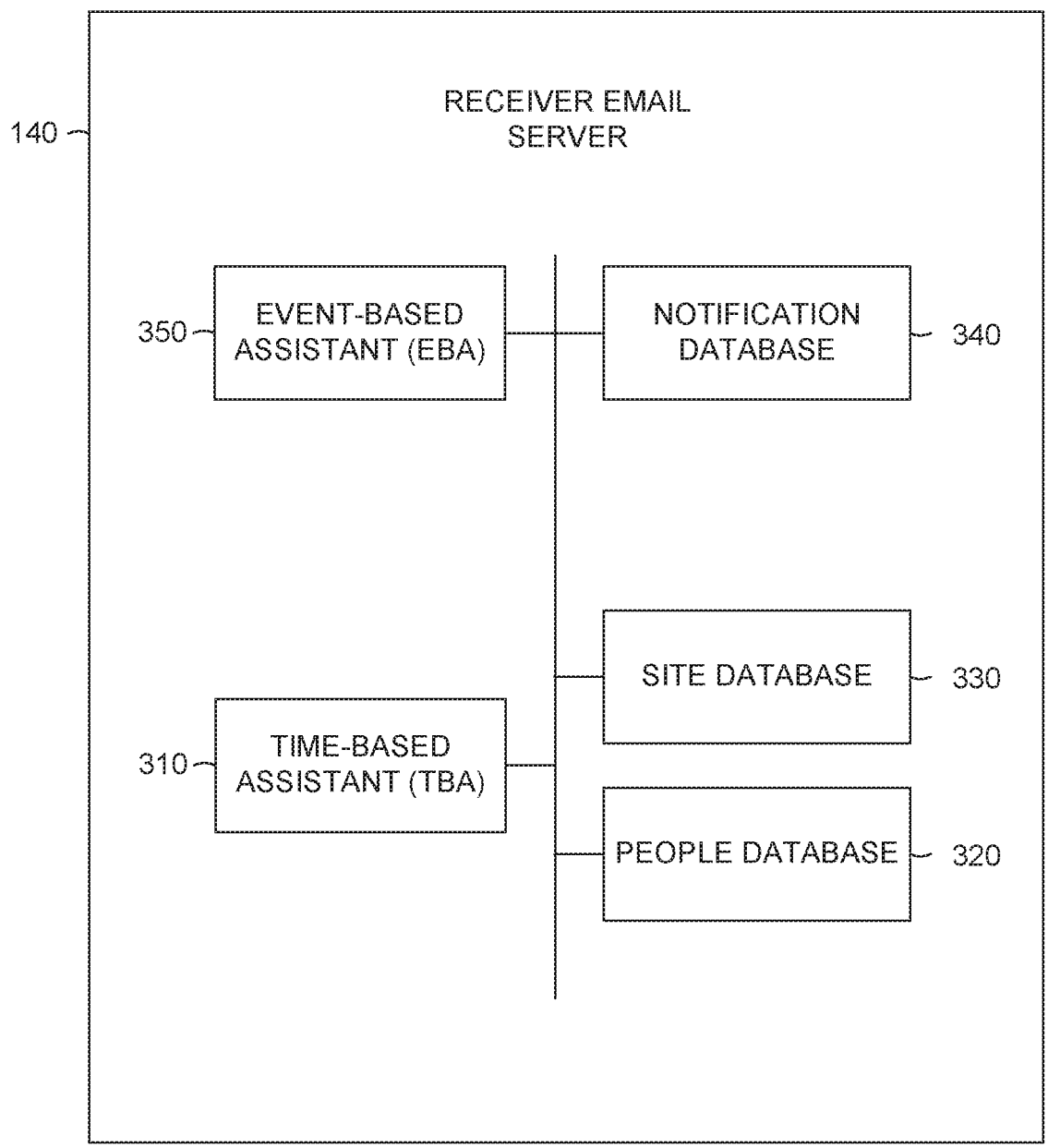
FIG. 3 is a block diagram illustrating components of a receiver email server, according to some example embodiments.

FIG. 3 is a block diagram illustrating components of the receiver email server 140, according to some example embodiments. The receiver email server 140 is configured to receive the control flow message (CFM), perform a verification process to confirm that the subscriber information for the user indicates that the user should receive the notification, and provide the notification based on the verification. Additionally, the receiver email server 140 determines and maintains subscriber information for the user and provides the subscriber information to the collaboration system 110. To enable these operations, the receiver email server 140 comprises a time-based assistant (TBA) 310, a people database 320, a site database 330, a notification database 340, and an event-based assistant (EBA) 350 all configured to communicate with each other (e.g., via a bus, shared memory, or a switch). The receiver email server 140 may also comprise other components (not shown) that are not pertinent to example embodiments. Furthermore, any one or more of the components (e.g., modules, storage) described herein may be implemented using hardware (e.g., a processor of a machine) or a combination of hardware and software. Moreover, any two or more of these components may be combined into a single component, and the functions described herein for a single component may be subdivided among multiple components.

The TBA 310 manages subscriptions at the receiver email server 140. Subscriptions can be explicitly set up by the user or be implicit (e.g., determined by the TBA 310). For example, the TBA 310 determines a top number (e.g., top 30) of people the user works with from a local people feed (e.g., accesses a database to determine people the user interacts with (e.g., meets with, emails, read articles of) the most). The TBA 310 also queries an active directory for reporting chains of the user of the current mailbox and the people the user works with the most. Individuals from the reporting chains (e.g., managers of the people the user works with the most) may be included in determining people the user may find content from to be relevant. The determined set of people along with any individuals the user explicitly subscribed to (e.g., people subscriptions) is stored to the people database 320.

Additionally, the TBA 310 determines sites that the user follows (e.g., from a collaboration system online database) and frequented sites (e.g., from a local office graph). The identities of these sites along with any sites explicitly subscribed to (e.g., site subscriptions) are locally stored in the site database 330. The TBA 310 may also determine topics that the user has subscribed to or are frequently accessed (e.g., topic subscriptions) and store these topic subscriptions. Additionally, the TBA 310 may manage audience subscriptions for the user. The audience subscriptions are associated with groups that the user may be a part of (e.g., in a particular location or building, full time employee, member of a particular team).

The TBA 310 may run periodically for each user (e.g., weekly) to determine and update at least any implicitly determined subscriptions for the user. In example embodiments, the TBA 310 provides the subscriber information (e.g., people, site, topic, and audience subscriptions) for the user to the collaboration system 110 (e.g., makes a call to a microservice of the collaboration system 110 with the subscriber information). The collaboration system 110 may then generate the bloom filter using the subscriber information as discussed above, and store a mapping between the user ID of the user and the generated bloom filter. While separate databases (e.g., 320, 330, and 340) are shown in the receiver email server 140, alternative embodiments may combine two or more of these databases.

In example embodiments, the control flow message (CFM) is received from the publisher email server 130 and stored in the notification database 340. The CFM comprises a hidden email that does not appear in an inbox of the user. The receipt of the CFM triggers a verification process to be performed.

The EBA 350 performs the verification process to verify the user's subscriptions in response to receiving the CFM. In particular, the EBA 350 double checks that the features of the article associated with the CFM match the user's subscriptions stored at the receiver email server 140. The verification process is performed because a bloom filter is noisy and may result is a few false positives (e.g., notifications or CFM being sent to users that are not subscribed to the features of the article). For example, depending on the configuration of the bloom filter, it can generate false positives due to random hash collisions for 0.1% of cases. Accordingly, the EBA 350 accesses the notification database 340 and reads the CFM. The EBA 350 may also access the people database 320 and the site database 330 (or any other database that stores the subscriber information at the receiver email server 140) and determine whether the subscriber information at the receiver email server 140 indicates that the user subscribes to at least one feature of the article. If the article is relevant (e.g., the user subscribes to at least one feature of the article), then the EBA 350 forwards the notification to the receiver device 150 (e.g., forwards the notification to a notification service, which ultimately pushes the notification to the receiver device 150).

Figure 4:
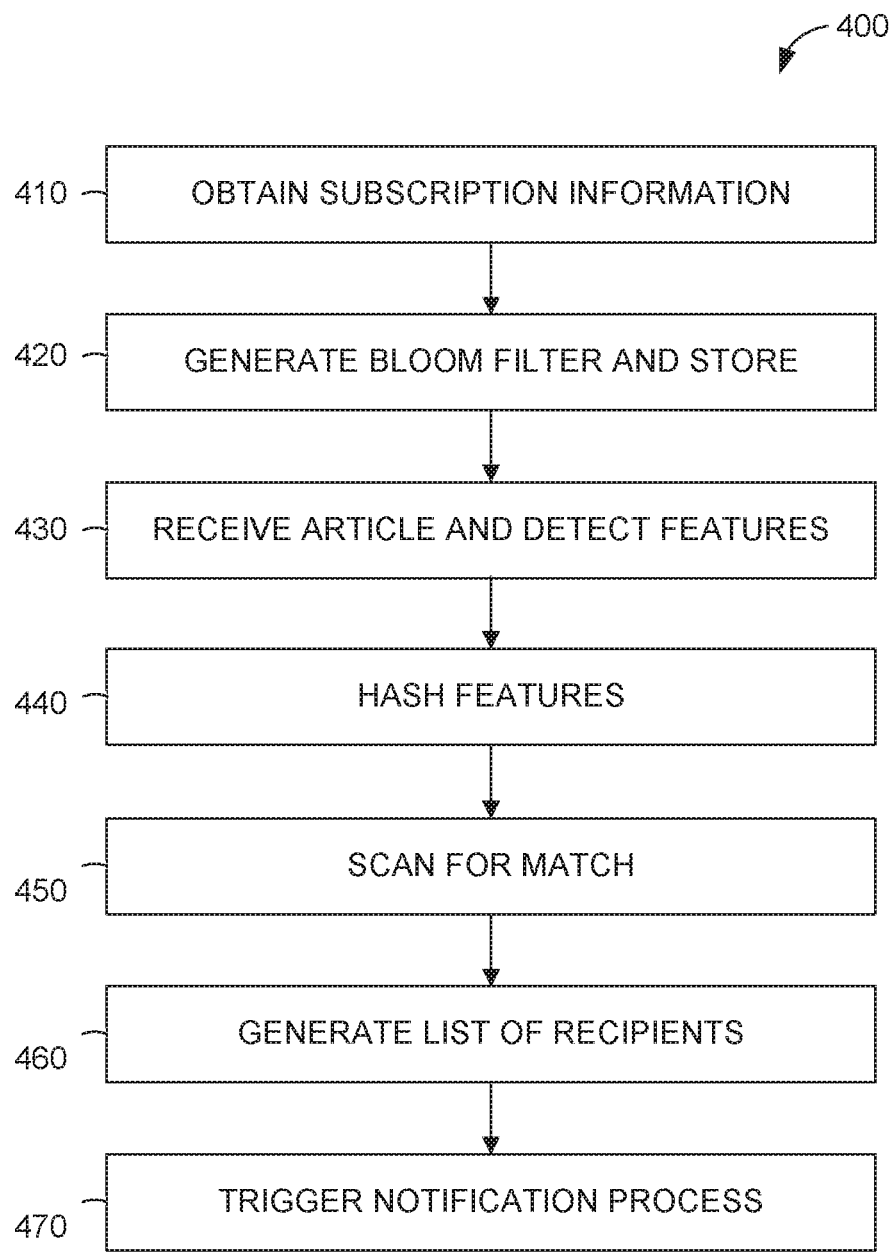
FIG. 4 is a flowchart illustrating operations of a method for providing notification delivery utilizing bloom filters, according to some example embodiments.

FIG. 4 is a flowchart illustrating operations of a method 400 for providing notification delivery utilizing bloom filters, according to some example embodiments. Operations in the method 400 may be performed by the collaboration system 110, using components described above with respect to FIG. 2. Accordingly, the method 400 is described by way of example with reference to the collaboration system 110. However, it shall be appreciated that at least some of the operations of the method 400 may be deployed on various other hardware configurations or be performed by similar components residing elsewhere in the network environment 100. Therefore, the method 400 is not intended to be limited to the collaboration system 110.

In operation 410, subscriber information is obtained (e.g., received, accesses, retrieved) by the subscription module 220 from the receiver email server 140. The subscriber information may include updates of subscriptions for each user of the collaboration system 110. The subscriber information indicates content, users, sites, or information that each user explicitly indicates or for which a system has inherently determined is relevant to the user, or for which the user is auto-subscribed to (e.g., the user is an audience member of). In example embodiments, the subscriber information may indicate a set of other users to get content from, sites the user typically gets content from, and topics of interest that the user has explicitly or inherently shown interest in.

In operation 420, a bloom filter is generated and stored for each user by the bloom filter module 230. In example embodiments, the bloom filter module 230 uses the identifiers of the subscriber information for each user (e.g., publisher ID, site ID, topic ID, audience ID) as raw values of a string. The bloom filter module 230 then hashes these values to obtain the bloom filter for each user. The bloom filter for each user is then stored to the data storage 260.

In operation 430, an article being published is received and features of the article are detected by the feature hash module 240. The features may comprise, for example, an author, a site, a topic, an audience (e.g., a set of people tagged for the article—full time employees or employees of a particular building, people in a particular organization). In some cases, the features comprise metadata associated with the article. In some cases, the features are determined by scanning the article for keywords.

In operation 440, the features detected for the article are hashed by the feature hash module 240 to obtain a hash set. In example embodiments, the same functions used to hash the subscriber information (e.g., to generate the bloom filter) is used to hash the features of the article.

In operation 450, the matching module 250 scans the data storage 260 for bloom filters that match the hash set of the article. Specifically, using the hash set of the features of the article, the matching module 250 scans the table in the data storage 260 for matching bits of the bloom filters. Because example embodiments utilize the bloom filters instead of traversing an organizational directory each time an article is published, example embodiments are operationally more efficient and faster in determining users that should be notified of the article. It is also efficient in terms of managing an index of subscribers, which would be an alternative to scanning an organizational directory. With bloom filters, an update cost for the list of subscriptions (e.g., list of recipients) is very cheap, since it involves updating a single record in the database (e.g., data storage. 260).

In operation 460, the list of recipients is generated by the matching module 250. In example embodiments, for each matching bloom filter, the matching module 250 identifies a corresponding user ID from the table. The user ID is then used to identifier a potential recipient that is added to the list of recipients.

In operation 470, a notification process is triggered by the matching module 250. Operation 470 is discussed in more detail in connection with FIG. 5 below. While example embodiments discuss the use of bloom filters, alternative embodiment can use any approximate member query (AMQ) filter.

Figure 5:
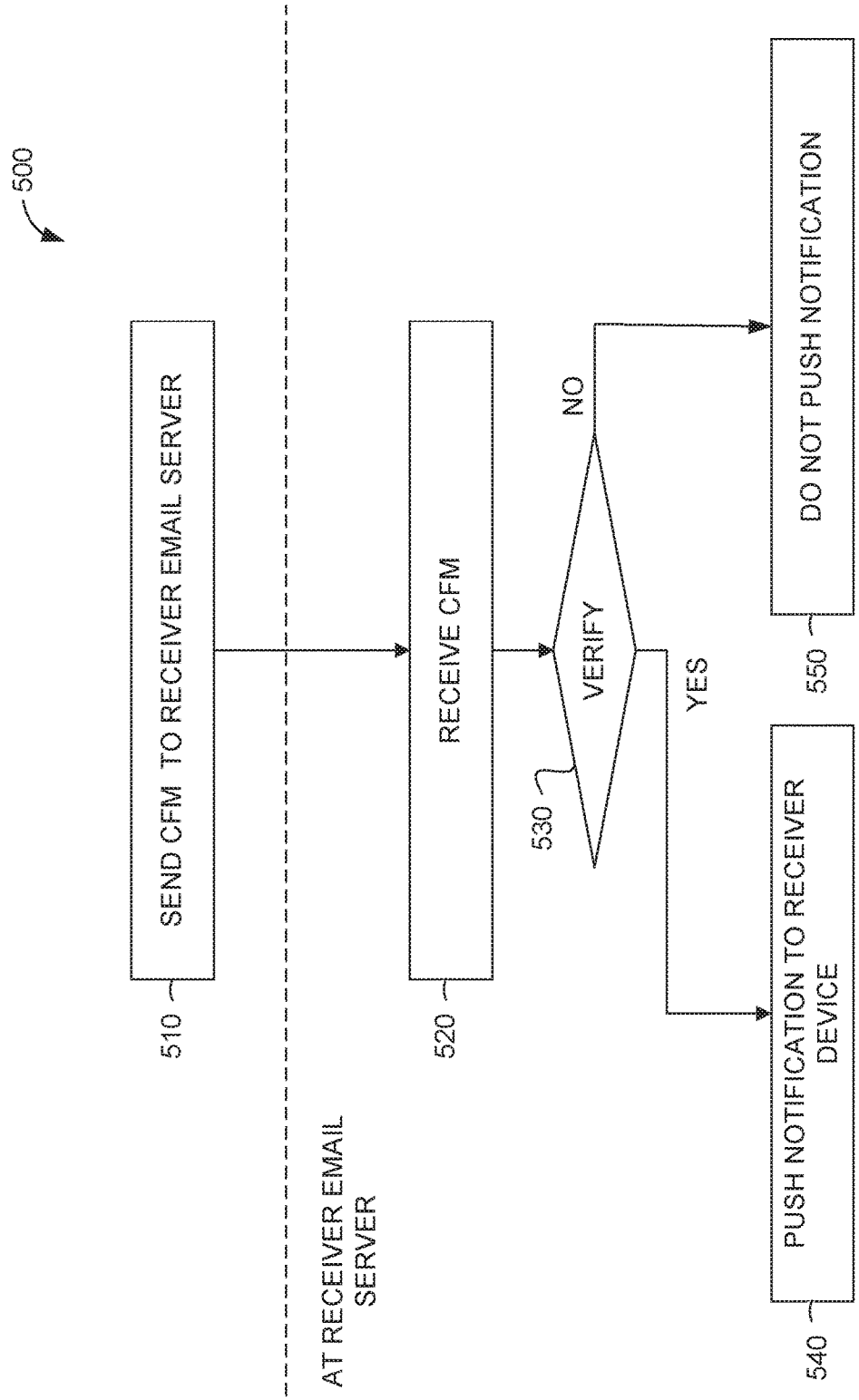
FIG. 5 is a flowchart illustrating operations of a notification process, according to some example embodiments.

FIG. 5 is a flowchart illustrating operations of a notification process or method 500 triggered by the collaboration system 110 (e.g., operation 470), according to some example embodiments. Operations in the method 500 may be performed by the collaboration system 110, the publication email server 130, and the receiver email server 140, using components described above with respect to FIG. 2 and FIG. 3. Accordingly, the method 500 is described by way of example with reference to the components. However, it shall be appreciated that at least some of the operations of the method 500 may be deployed on various other hardware configurations or be performed by similar components residing elsewhere in the network environment 100. Therefore, the method 500 is not intended to be limited to these components.

Once the list of recipients is determined, the collaboration system 110 invokes a distribution pipeline to send the notification to the list of recipients (e.g., the matching module 250). In operation 510, a control flow message (CFM) is transported to the receiver email server 140 of a user on the list of recipients. In example embodiments, the distribution pipeline initially sends the CFM through the publisher email server 130 associated with the publisher device 120. Specifically, a call is made to the publisher email server 130 (e.g., Microsoft Exchange) with the list of recipients. The publisher email server 130 then sends the CFM over a transport/substrate bus to an email server associated with each user on the list of recipients (a "receiver email server 140").

At the receiver email server 140, the CFM is received in operation 520. In example embodiments, the CFM is stored in the notification database 340. The CFM comprises a hidden email that does not appear in an inbox of the recipient.

In operation 530, a verification process is performed by the EBA 350. Accordingly, the EBA 350 accesses the notification database 340 and reads the CFM. The EBA 350 then double checks whether one or more features of the article match the user's subscriptions stored in the databases (e.g., database 320 and 330) at the receiver email server 140. If the article is verified to be relevant to the user (e.g., one or more features match the subscriber information for the user) in operation 530, then the EBA 350 pushes the notification to the receiver device 150 in operation 540. However, if the article is not verified in operation 530, then a notification is not pushed in operation 550.

Figure 6:
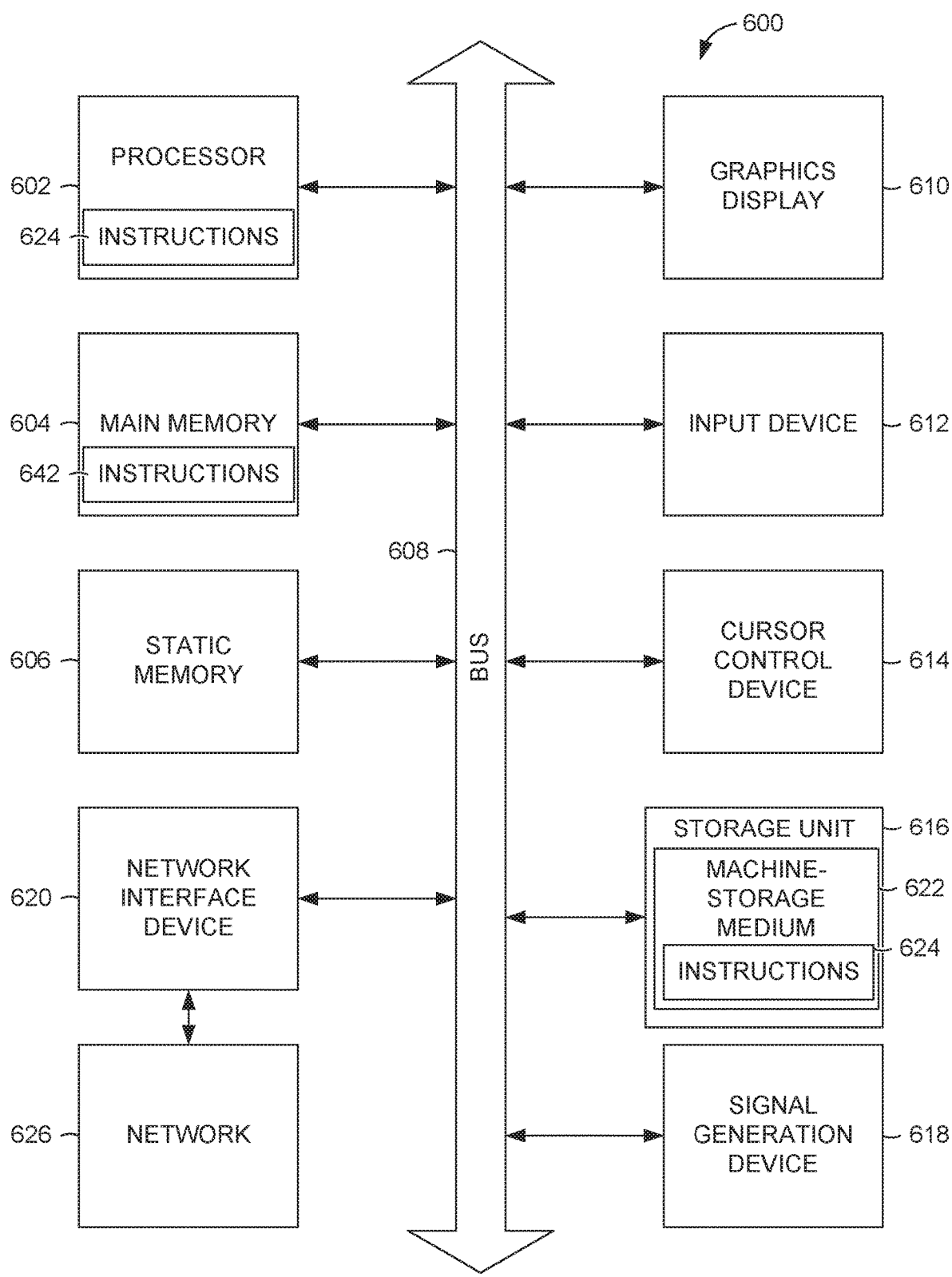
FIG. 6 is a block diagram illustrating components of a machine, according to some example embodiments, able to read instructions from a machine-readable medium and perform any one or more of the methodologies discussed herein.

FIG. 6 illustrates components of a machine 600, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 6 shows a diagrammatic representation of the machine 600 in the example form of a computer device (e.g., a computer) and within which instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flow diagrams of FIGS. 4 and 5. In one embodiment, the instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624 (sequentially or otherwise) that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, or a cathode ray tube (CRT), or any other display capable of displaying graphics or video). The machine 600 may also include an alphanumeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a sound card, an amplifier, a speaker, a headphone jack, or any suitable combination thereof), and a network interface device 620.

The storage unit 616 includes a machine-readable medium 622 (e.g., a tangible machine-readable storage medium) on which is stored the instructions 624 (e.g., software) embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered as machine-readable media (e.g., tangible and non-transitory machine-readable media). The instructions 624 may be transmitted or received over a network 626 via the network interface device 620.

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a system for providing notification delivery based on utilization of bloom filters. The system includes one or more processors and a memory storing instructions that, when executed by the one or more hardware processors, causes the one or more hardware processors to perform operations comprising obtaining subscriber information each user of a collaboration system, the subscriber information corresponding to one or more features of content that are relevant to each user; hashing, using at least one hashing function, the subscriber information to generate a bloom filter for each user; receiving an article to be published, the article comprising a set of features; hashing, using the at least one hashing function, the set of features to obtain a hash set for the article; comparing the hash set to the bloom filter for each user to identify a match, the match indicating a feature of the article matching the subscriber information; and generating a list of recipients based on the match.

In example 2, the subject matter of example 1 can optionally include invoking a distribution pipeline to send a notification to each user on the list of recipients.

In example 3, the subject matter of examples 1-2 can optionally include causing a control flow message to be sent to an email server of each user on the list of recipients.

In example 4, the subject matter of examples 1-3 can optionally include in response to receiving the control flow message, verifying, at the email server of a user, that subscriber information for the user matches at least one feature of the article; and in response to the verifying, sending the notification to a user device of the user.

In example 5, the subject matter of examples 1-4 can optionally include detecting the set of features for the article.

In example 6, the subject matter of examples 1-5 can optionally include storing the bloom filter to a table in a data storage, the table including a user identifier of a user for each entry of the bloom filter.

In example 7, the subject matter of examples 1-6 can optionally include wherein the obtaining the subscriber information comprises obtaining the subscriber information from an email server corresponding to each user.

In example 8, the subject matter of examples 1-7 can optionally include wherein the hashing the subscriber information comprises using identifiers of the subscriber information as raw values of a string; and hashing the raw values to obtain the bloom filter for each user.

In example 9, the subject matter of examples 1-8 can optionally include wherein the subscriber information comprises one or more indications of a publisher to obtain content from that correspond to a publisher identifier, a site to obtain content from that corresponds to a site identifier, a topic indicated to be relevant that corresponds to a topic identifier, or an audience that each user is a member of that corresponds to an audience identifier.

Example 10 is a method for providing notification delivery based on utilization of bloom filters. The method comprises obtaining, subscriber information each user of a collaboration system, the subscriber information corresponding to one or more features of content that are relevant to each user; hashing, using at least one hashing function by one or more hardware processors, the subscriber information to generate a bloom filter for each user; receiving an article to be published, the article comprising a set of features; hashing, using the at least one hashing function, the set of features to obtain a hash set for the article; comparing the hash set to the bloom filter for each user to identify a match, the match indicating a feature of the article matching the subscriber information; and generating a list of recipients based on the match.

In example 11, the subject matter of example 10 can optionally include invoking a distribution pipeline to send a notification to each user on the list of recipients.

In example 12, the subject matter of examples 10-11 can optionally include causing a control flow message to be sent to an email server of each user on the list of recipients.

In example 13, the subject matter of examples 10-12 can optionally include in response to receiving the control flow message, verifying, at the email server of a user, that subscriber information for the user matches at least one feature of the article; and in response to the verifying, sending the notification to a user device of the user.

In example 14, the subject matter of examples 10-13 can optionally include detecting the set of features for the article.

In example 15, the subject matter of examples 10-14 can optionally include storing the bloom filter to a table in a data storage, the table including a user identifier of a user for each entry of the bloom filter.

In example 16, the subject matter of examples 10-15 can optionally include wherein the obtaining the subscriber information comprises obtaining the subscriber information from an email server corresponding to each user.

In example 17, the subject matter of examples 10-16 can optionally include wherein the hashing the subscriber information comprises using identifiers of the subscriber information as raw values of a string; and hashing the raw values to obtain the bloom filter for each user.

In example 18, the subject matter of examples 10-17 can optionally include wherein the subscriber information comprises one or more indications of a publisher to obtain content from that correspond to a publisher identifier, a site to obtain content from that corresponds to a site identifier, a topic indicated to be relevant that corresponds to a topic identifier, or an audience that each user is a member of that corresponds to an audience identifier Example 19 is a machine-storage medium for providing notification delivery based on utilization of bloom filters. The machine-storage medium configures one or more processors to perform operations comprising obtaining subscriber information each user of a collaboration system, the subscriber information corresponding to one or more features of content that are relevant to each user; hashing, using at least one hashing function, the subscriber information to generate a bloom filter for each user; receiving an article to be published, the article comprising a set of features; hashing, using the at least one hashing function, the set of features to obtain a hash set for the article; comparing the hash set to the bloom filter for each user to identify a match, the match indicating a feature of the article matching the subscriber information; and generating a list of recipients based on the match.

In example 20, the subject matter of example 19 can optionally include wherein the hashing the subscriber information comprises using identifiers of the subscriber information as raw values of a string; and hashing the raw values to obtain the bloom filter for each user.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
one or more hardware processors; and
a memory storing instructions that, when executed by the one or more hardware processors, causes the one or more hardware processors to perform operations comprising:
obtaining subscription information for each user of a plurality of users of a collaboration system, the subscription information corresponding to one or more features of content that are relevant to each user, wherein the subscription information comprises: (a) a site to obtain content that corresponds to a site identifier, (b) a topic indicated to be relevant that corresponds to a topic identifier, or (c) an audience that each user is a member of that corresponds to an audience identifier;
hashing, using at least one hashing function, the subscription information for each of a first user and a second user to generate a first bloom filter for the first user and a second bloom filter for the second user;
receiving a content item to be published, the content item comprising a set of features;
hashing, using the at least one hashing function, the set of features to obtain a hash set for the content item;
comparing the hash set to each of the first bloom filter and the second bloom filter to identify a match, the match indicating a feature of the content item matching the subscription information; and
generating a list of recipients based on the match.

2. The system of claim 1, wherein the operations further comprise invoking a distribution pipeline to send a notification to each user on the list of recipients.

3. The system of claim 2, wherein the operations further comprise causing a control flow message to be sent to an email server of each user on the list of recipients.

4. The system of claim 3, wherein the operations further comprise:

in response to receiving the control flow message, verifying, at the email server of a user, that subscription information for the user matches at least one feature of the content item; and
in response to the verifying, sending the notification to a user device of the user.

5. The system of claim 1, wherein the operations further comprise detecting the set of features for the content item.

6. The system of claim 1, wherein the operations further comprise storing the bloom filter to a table in a data storage, the table including a user identifier of a user for each entry of the bloom filter.

7. The system of claim 1, wherein the obtaining the subscription information comprises obtaining the subscriber information from an email server corresponding to each user.

8. The system of claim 1, wherein the hashing the subscription information comprises: using identifiers of the subscription information as raw values of a string; and hashing the raw values to obtain the bloom filter for each user.

9. A method comprising:
obtaining, subscription information for each user of a collaboration system, the subscription information corresponding to one or more features of content that are relevant to each user, wherein the subscription information comprises: (a) a site to obtain content that corresponds to a site identifier, (b) a topic indicated to be relevant that corresponds to a topic identifier, or (c) an audience that each user is a member of that corresponds to an audience identifier;
hashing, using at least one hashing function by one or more hardware processors, the subscription information to generate a bloom filter for each user;
receiving a content item to be published, the content item comprising a set of features; hashing, using the at least one hashing function, the set of features to obtain a hash set for the content item;
comparing the hash set to the bloom filter for each user to identify a match, the match indicating a feature of the content item matching the subscription information; and
delivering the content item to one or more recipients based on the match.

10. The method of claim 9, further comprising invoking a distribution pipeline to send a notification to each user on the list of recipients.

11. The method of claim 10, further comprising causing a control flow message to be sent to an email server of each user on the list of recipients.

12. The method of claim 11, further comprising:
in response to receiving the control flow message, verifying, at the email server of a user, that subscription information for the user matches at least one feature of the content item; and in response to the verifying, sending the notification to a user device of the user.

13. The method of claim 9, further comprising detecting the set of features for the content item.

14. The method of claim 9, further comprising storing the bloom filter to a table in a data storage, the table including a user identifier of a user for each entry of the bloom filter.

15. The method of claim 9, wherein the obtaining the subscription information comprises obtaining the subscription information from an email server corresponding to each user.

16. The method of claim 9, wherein the hashing the subscriber information comprises: using identifiers of the subscription information as raw values of a string; and hashing the raw values to obtain the bloom filter for each user.

17. The method of claim 16, wherein the subscription information comprises one or more indications of a publisher to obtain content from that correspond to a publisher identifier, a site to obtain content from that corresponds to a site identifier, a topic indicated to be relevant that corresponds to a topic identifier, or an audience that each user is a member of that corresponds to an audience identifier.

18. A tangible machine readable storage medium storing instructions that, when executed by one or more processors of a machine, cause the one or more processors to perform operations comprising:

obtaining subscription information for each user of a collaboration system, the subscription information corresponding to one or more features of content that are relevant to each user, wherein the subscription information comprises: (a) a site to obtain content that corresponds to a site identifier, (b) a topic indicated to be relevant that corresponds to a topic identifier, or (c) an audience that each user is a member of that corresponds to an audience identifier;

hashing, using at least one hashing function, the subscription information to generate a bloom filter for each user;

receiving an article to be published, the article comprising a set of features;

hashing, using the at least one hashing function, the set of features to obtain a hash set for the article;

comparing the hash set to the bloom filter for each user to identify a match, the match indicating a feature of the article matching the subscription information;

and generating a list of recipients based on the match.

19. The tangible machine-readable storage medium of claim 18, wherein the hashing the subscription information comprises:

using identifiers of the subscriber information as raw values of a string; and hashing the raw values to obtain the bloom filter for each user.

20. The tangible machine-readable storage medium of claim 18, wherein the operations further comprise storing the bloom filter to a table in a data storage, the table including a user identifier of a user for each entry of the bloom filter.

* * * * *